United States Patent
Kishimoto

(10) Patent No.: US 10,776,590 B2
(45) Date of Patent: Sep. 15, 2020

(54) WIRELESS TAG READING APPARATUS

(71) Applicant: TOSHIBA TEC KABUSHIKI KAISHA, Tokyo (JP)

(72) Inventor: Seiya Kishimoto, Tokyo (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/575,727

(22) Filed: Sep. 19, 2019

(65) Prior Publication Data

US 2020/0104555 A1   Apr. 2, 2020

(30) Foreign Application Priority Data

Oct. 2, 2018  (JP) .................... 2018-187454

(51) Int. Cl.
*G06K 7/08*   (2006.01)
*G06K 7/10*   (2006.01)

(52) U.S. Cl.
CPC ..... *G06K 7/10316* (2013.01); *G06K 7/10366* (2013.01)

(58) Field of Classification Search
CPC ......... G06K 7/00; G06K 7/08; G06K 17/0025
USPC .............. 235/451, 492, 462.46, 472.02
See application file for complete search history.

(56) References Cited

U.S. PATENT DOCUMENTS

| | | | |
|---|---|---|---|
| 6,407,711 B1* | 6/2002 | Bonebright | H01Q 1/286 343/705 |
| 9,810,760 B1* | 11/2017 | Borchardt | G01S 3/043 |
| 10,451,706 B1* | 10/2019 | Hollar | G01S 5/0215 |
| 2004/0183719 A1* | 9/2004 | Natsume | H01Q 3/24 342/147 |
| 2008/0036607 A1* | 2/2008 | Suzuki | G06K 7/0008 340/572.7 |
| 2008/0318684 A1* | 12/2008 | Rofougaran | G01S 13/878 463/39 |
| 2015/0268326 A1* | 9/2015 | Sung | H04W 64/00 455/456.3 |
| 2015/0302708 A1 | 10/2015 | Hattori | |

* cited by examiner

*Primary Examiner* — Daniel St Cyr
(74) *Attorney, Agent, or Firm* — Kim & Stewart LLP

(57) ABSTRACT

A wireless tag reading apparatus includes an antenna, an actuator, a phase detector, and a processor. The actuator is configured to move the antenna along a predetermined effective detection region. The processor is configured to calculate a first phase difference based on a phase of a response wave signal received by the antenna at a first plurality of antenna positions, and a second phase difference based on the phase of the response wave signal received by the antenna at a second plurality of antenna positions. The processor is configured to calculate first and second incident angles of the response wave signal for the antenna at the first and second plurality of antenna positions, respectively, based on the first and second phase differences, respectively. The processor is configured to determine whether or not the wireless tag is in the predetermined effective detection region based on the first and second incident angles.

20 Claims, 6 Drawing Sheets

WIRELESS TAG READING APPARATUS

CROSS-REFERENCE TO RELATED APPLICATION

This application is based upon and claims the benefit of priority from Japanese Patent Application No. 2018-187454, filed on Oct. 2, 2018, the entire contents of which are incorporated herein by reference.

FIELD

Embodiments described herein relate generally to a wireless tag reading apparatus.

BACKGROUND

A conventional reading apparatus reads information from a wireless tag, such as an RFID (Radio Frequency Identification) tag, that has been attached to an item or article.

In such a reading apparatus, a metal container is used to accommodate the tagged at. A wireless tag reader and an antenna are arranged for reading information from the RFID tag in the container through wireless communication. The reading apparatus includes an antenna drive section, and can change the position of the antenna using the antenna drive section.

The electromagnetic waves radiated from the antenna do not leak to the outside of the metal container of the reading apparatus. With this arrangement, the reading apparatus can at one time read information from several RFID tags attached to different articles stored within the apparatus. On the other hand, the reading apparatus cannot read information from an RFID tag outside of the apparatus.

DETAILED DESCRIPTION

According to an embodiment, a wireless tag reading apparatus includes an antenna, an actuator, a phase detector, and a processor. The antenna is configured to receive a response wave signal from a wireless tag. The actuator is configured to move the antenna in a direction along a predetermined effective detection region. The phase detector is configured to detect a phase of the response wave signal received by the antenna. The processor is configured to calculate a first phase difference based on the phase of the response wave signal received by the antenna at a first plurality of antenna positions that are proximate to each other, and a second phase difference based on the phase of the response wave signal received by the antenna at a second plurality of antenna positions that are proximate to each other. The processor is configured to calculate a first incident angle of the response wave signal for the antenna at the first plurality of antenna positions based on the first phase difference, and a second incident angle of the response wave signal for the antenna at the second plurality of antenna positions based on the second phase difference. The processor is configured to determine whether the wireless tag is in the predetermined effective detection region based on the first incident angle and the second incident angle, and register tag information represented by the response wave signal upon determining that the wireless tag is in the predetermined effective detection region.

Hereinafter, example embodiments are described with reference to the accompanying drawings.

A configuration of a wireless tag reading apparatus 1 is described.

Figure 1:
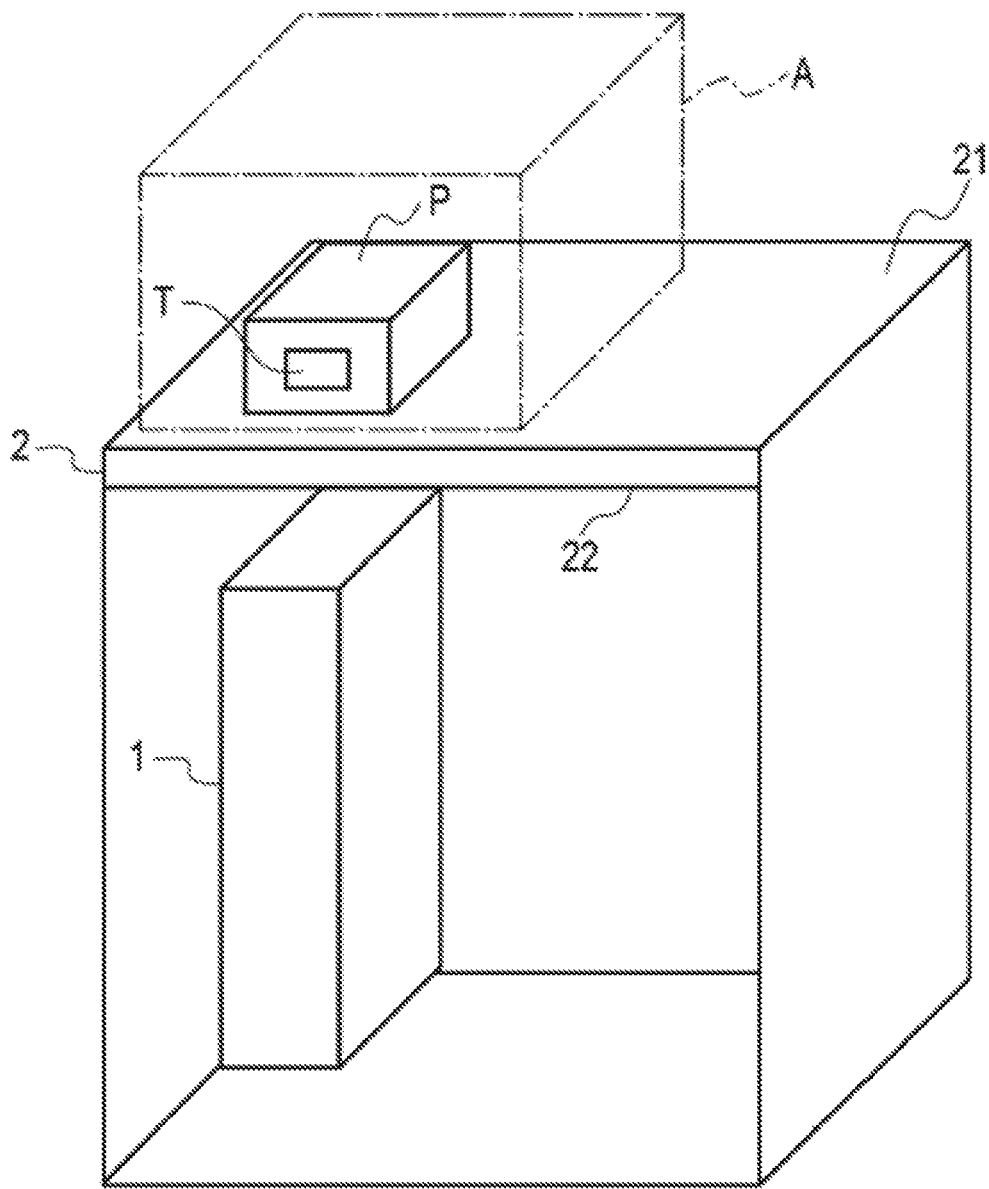
FIG. 1 is a diagram schematically illustrating a wireless tag reading apparatus according to an embodiment.

FIG. 1 is a diagram schematically illustrating the wireless tag reading apparatus 1. For example, the wireless tag reading apparatus 1 is used for performing registration of an article P. In this context, the registration processing may be associated as retail sales registration, inventory tracking, or an inspection service. For example, the wireless tag reading apparatus 1 is installed in a retail store or a warehouse.

The wireless tag reading apparatus 1 is arranged on a table 2. One or more articles P to which RFID tags T are attached can be placed on the table 2. The table 2 includes a horizontal upper surface 21 and a lower surface 22 opposite to the upper surface 21. An article P may be placed on a shelf or the like, or may be stacked on the upper surface 21 of the table 2. The RFID tag T includes an antenna and a microchip (packaged integrated circuit), including a storage section capable of storing information, on a resin base. The RFID tag T is an example of a wireless tag.

The wireless tag reading apparatus 1 reads information from an RFID tag T attached to an article P placed on the upper surface 21 of the table 2. The wireless tag reading apparatus 1 reads identification information such as a tag ID unique to the RFID tag T and other information recorded in the RFID tag T.

The wireless tag reading apparatus 1 determines whether or not the RFID tag T is in a predetermined area A above the upper surface 21 of the table 2 as described below. The predetermined area A is indicated by a dot-and-dash line. The predetermined area A is a three-dimensional virtual region above the upper surface 21 of the placing table 2. In general, the size and shape of the predetermined area A is not limited in any particular manner. The predetermined area A is set as a region from which the wireless tag reading apparatus 1 is intended to read information from the RFID tags T for purposes of registration. Any RFID tag T present in the predetermined area A is considered to be a tag for which it desired to be read/registered. Those RFID tags T outside of the predetermined area A are not presently targets for reading/registration.

If an RFID tag T is in the predetermined area A, the wireless tag reading apparatus 1 reads and registers the information recorded in the RFID tag T. In this way, the wireless tag reading apparatus 1 can register the article P to which the RFID tag T is attached. On the other hand, if an RFID tag T is outside of the predetermined area A, the wireless tag reading apparatus 1 ignores/discards any information read from such an RFID tag T. In this way, the wireless tag reading apparatus 1 does not register any article P outside the predetermined area A.

Figure 2:
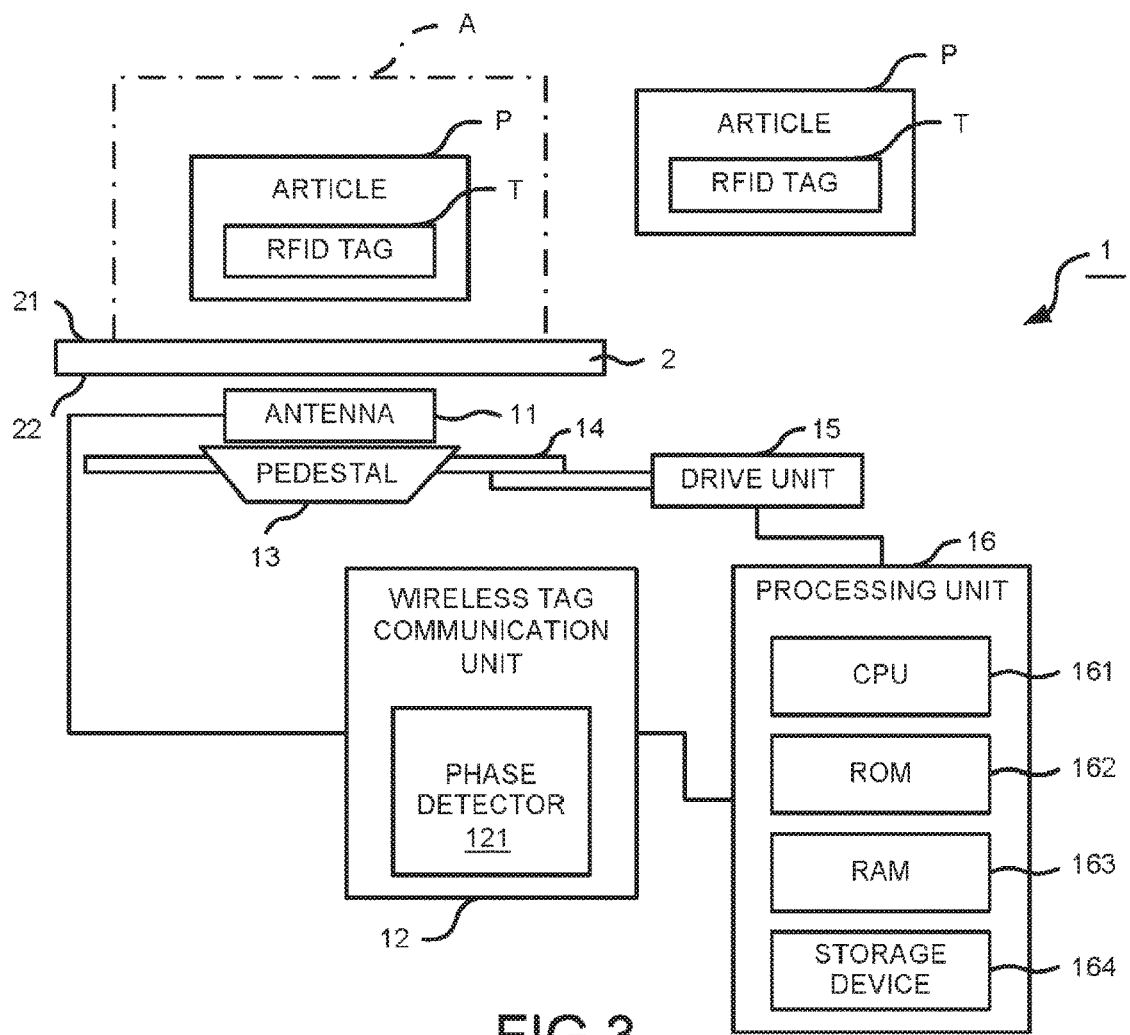
FIG. 2 is a block diagram illustrating the wireless tag reading apparatus according to an embodiment.

FIG. 2 is a block diagram illustrating the wireless tag reading apparatus 1.

The wireless tag reading apparatus 1 includes an antenna 11, a wireless tag communication unit 12, a pedestal 13, a support member 14, a drive unit 15 and a processing unit 16.

The antenna 11 is positioned on the lower surface 22 side of the table 2. The antenna 11 radiates electromagnetic waves from the lower surface 22 side of the table 2 towards the upper surface 21 side. The antenna 11 can be an antenna which radiates circular polarization, such as a patch antenna or a sequential array, but the functioning and shape of the antenna are not limited.

The antenna 11 receives a response wave (may be referred to as a response wave signal) from the RFID tag T as explained further below. In this example, the RFID tag T is activated by receiving power supplied by the electromagnetic waves radiated from the antenna 11. The RFID tag T in turn radiates a response wave. In this way, the antenna 11 receives the response wave from the RFID tags T. The response wave provides information, such as identification information, previously recorded in the RFID tag T. The information be a tag ID or other information.

The antenna 11 is positioned on the lower surface 22 side of the table 2, but it is not limited thereto. The antenna 11 may be positioned on the upper surface 21 side of the table 2 so as to radiate electromagnetic waves in the horizontal direction. The wireless tag reading apparatus 1 is not limited to including only one antenna 11, and may include two or more antennas.

The wireless tag communication unit 12 is electrically connected to the antenna 11. The wireless tag communication unit 12 radiates electromagnetic waves through the antenna 11 to communicate with the RFID tag T. The wireless tag communication unit 12 communicates with the RFID tag T via the antenna 11 to receive the response wave received by the antenna 11. The wireless tag communication unit 12 demodulates the information transmitted through the response wave to obtain information including the identification information recorded in the RFID tag T such as the tag ID and other information. In this way, the wireless tag communication unit 12 reads the information recorded in the RFID tag T from the RFID tag T. The wireless tag communication unit 12 sends the information recorded in the RFID tag T to the processing unit 16. For example, the wireless tag communication unit 12 is a reader/writer.

The wireless tag communication unit 12 includes a phase detector 121. The phase detector 121 detects a phase of the response wave received by the antenna 11. The phase detector 121 sends the information indicating the phase of the response wave to the processing unit 16. The information indicating the phase of the response wave is also referred to as phase information. For example, the phase detector 121 sends the phase information to the processing unit 16 in association with the information recorded in the RFID tag T. The phase detector 121 may be an analog circuit or a digital circuit. Instead of this, the phase detector 121 may obtain the phase of the response wave through calculation from signal information obtained by a detector in the wireless tag communication unit 12. The configuration of the phase detector 121 is not limited. The phase detector 121 may be referred to as a phase detection section.

The pedestal 13 is fixed to the antenna 11. The pedestal 13 is movable horizontally with the antenna 11 is fixed thereon.

The support member 14 fixes the pedestal 13. The support member 14 is movable horizontally in a state in which the pedestal 13 is fixed thereon.

The drive unit 15 is mechanically connected to the support member 14. The drive unit 15 moves the support member 14 under the control of the processing unit 16. The drive unit 15 may be referred to as an actuator. The drive unit 15 moves the support member 14 such that the antenna 11 moves within a range facing the predetermined area A in the vertical direction. For example, the drive unit 15 moves the support member 14 such that the position of the antenna 11 moves within a range facing a virtual surface of the predetermined area A on the upper surface 21 of the table 2. In this way, the drive unit 15 can change the position of the antenna 11.

The drive unit 15 obtains information indicating the position of the antenna 11 that moves as the support member 14 moves. The information indicating the position of the antenna 11 is also referred to as position information of the antenna 11. For example, the position information of the antenna 11 indicates coordinates on the basis of any position; however, it is not limited thereto. The drive unit 15 sends the position information of the antenna 11 to the processing unit 16. For example, the drive unit 15 is a motor or the like. The drive unit 15 may be electrically operated device or a manually operated device, and a drive type thereof is not limited. The drive unit 15 is an example of a drive section.

The processing unit 16 is electrically connected to the wireless tag communication unit 12 and the drive unit 15. The processing unit 16 controls operations of the wireless tag reading apparatus 1 and processes various kinds of information. The processing unit 16 is an example of a processing section.

The processing unit 16 includes a CPU (Central Processing Unit) 161, a ROM (Read Only Memory) 162, a RAM (Random Access Memory) 163 and a storage device 164.

The CPU 161 controls the operations of the wireless tag reading apparatus 1 and processes various kinds of information by executing programs stored in advance in the ROM 162 or the storage device 164. The CPU 161 is an example of a processor. The CPU 161 is also an example of the processing section.

The CPU 161 executes the processing described below.

The CPU 161 outputs a movement instruction based on a predetermined movement path of the antenna 11 to the drive unit 15 to control the drive unit 15. The CPU 161 changes the position of the antenna 11 by controlling the drive unit 15. For example, the CPU 161 changes the position of the antenna 11 by repeatedly moving and stopping the antenna 11.

The CPU 161 controls the wireless tag communication unit 12 to acquire the phase information and the information recorded in the RFID tag T from the wireless tag communication unit 12. Here, for example, the CPU 161 radiates electromagnetic waves through the antenna 11 at the stop position of the antenna 11. If the wireless tag communication unit 12 detects the phase of the response wave received by the antenna 11, the CPU 161 acquires the phase information and the information recorded in the RFID tag T from the wireless tag communication unit 12. The CPU 161 stores the phase information and the information recorded in the RFID tag T in the storage device 164.

The CPU 161 specifies the position at which the antenna 11 receives the response wave. Here, for example, by acquiring the phase information from the wireless tag communication unit 12, the CPU 161 determines that the antenna 11 receives the response wave. The CPU 161 acquires the position information of the antenna 11 from the drive unit 15 in response to the acquisition of the phase information. The CPU 161 acquires the position information of the antenna 11 from the drive unit 15 as information indicating the position at which the antenna 11 receives the response wave. The position at which the antenna 11 receives the response wave is also referred to as a reception position. The information indicating the reception position is also referred to as reception position information. The CPU 161 stores the reception position information in the storage device 164 in association with the phase information and the information recorded in the RFID tag T.

The CPU 161 determines whether or not the RFID tag T is in the predetermined area A by executing a position estimation processing for the RFID tag T described below. The CPU 161 determines whether the information recorded in the RFID tag T is required to be registered according to a determination result indicating whether or not the RFID tag T is in the predetermined area A. If the RFID tag T is in the predetermined area A, the CPU 161 registers the information recorded in the RFID tag T and read from the RFID tag T. On the other hand, if the RFID tag T is outside of the predetermined area A, the CPU 161 discards the information recorded in the RFID tag T and read from the RFID tag T.

The ROM 162 stores various programs and data.

The RAM 163 temporarily stores various programs, and stores data necessary for executing application programs, execution results, and the like.

The storage device 164 stores various programs and data. For example, the storage device 164 is an HDD (Hard Disk Drive), an SSD (Solid State Drive), or the like.

The storage device 164 stores the reception position information. The storage device 164 stores the phase information for each of the reception positions. The storage device 164 stores the information recorded in the RFID tag T for each of the reception positions. The phase information and the information recorded in the RFID tag T are associated with the reception position information.

Next, an example of changing the position of the antenna 11 by the CPU 161 is described.

Figure 3:
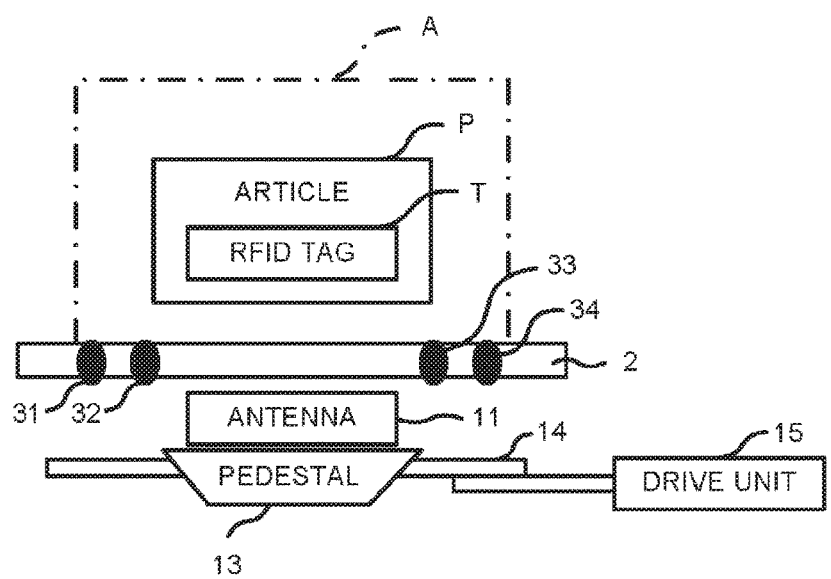
FIG. 3 is a diagram illustrating positions of an antenna of the wireless tag reading apparatus according to an embodiment.

FIG. 3 is a diagram illustrating positions of the antenna 11.

The CPU 161 moves the support member 14 through the drive unit 15 such that the antenna 11 moves in the range facing the predetermined area A in the vertical direction. Positions 31 to 34 indicate the reception positions. The positions 31 to 34 may also indicate positions within the predetermined area A facing the reception positions in the vertical direction. The positions 31 and 32 correspond to a first end of the predetermined area A in the horizontal direction. The first end includes an outer edge in the horizontal direction of the predetermined area A. The position 31 is closer to the outer edge of the predetermined area A in the horizontal direction than the position 32.

The positions 33 and 34 correspond to a second end different from the first end in the horizontal direction of the predetermined area A. The second end includes an outer edge in the horizontal direction of the predetermined area A. For example, the second end includes an outer edge facing the outer edge included in the first end of the predetermined area A, and is arranged at a position facing the first end. The position 34 is closer to the outer edge of the predetermined area A in the horizontal direction than the position 33.

The storage device 164 stores the reception position information, the phase information and the information recorded in the RFID tag T in an associated manner for each of the positions 31 to 34. Here, for convenience of description, four reception positions aligned in one direction are shown, but the reception positions are not limited to those. The reception position may be a position other than the positions corresponding to the ends of the predetermined area A in the horizontal direction.

Figure 4:
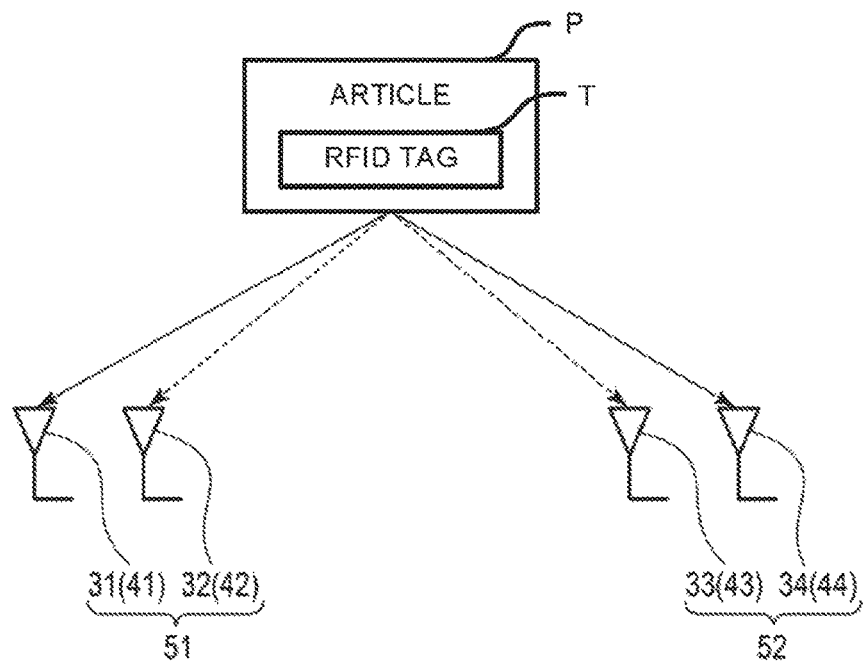
FIG. 4 is a diagram illustrating a virtual antenna of the wireless tag reading apparatus according to an embodiment.

FIG. 4 is a diagram illustrating a virtual antenna at the reception position.

The antenna 11 receives the response wave at the positions 31 to 34 shown in FIG. 4. Changing the position of the antenna 11 by the CPU 161 is equivalent to that the wireless tag reading apparatus 1 includes virtual antennas 41 to 44 at the positions 31 to 34, respectively.

The CPU 161 assigns the phase information associated with each of the two or more reception positions to each of the plurality of groups. For example, the CPU 161 refers to the reception position information and the phase information associated with the reception position information stored in the storage device 164. The CPU 161 sets the phase information associated with each of two or more adjacent reception positions as a group to form a plurality of groups.

In the example shown in FIG. 4, the CPU 161 assigns the phase information associated with the position 31 and the phase information associated with the position 32 to a first group 51. In this way, the CPU 161 assigns the phase information associated with each of the two or more reception positions corresponding to the first end in the horizontal direction of the predetermined area A to the first group 51. The CPU 161 may assign the phase information associated with each of any two or more reception positions other than the positions corresponding to the end to the first group 51. The CPU 161 may assign the phase information associated with each of three or more reception positions to the first group 51.

In the example shown in FIG. 4, the CPU 161 assigns the phase information associated with the position 33 and the phase information associated with the position 34 to a second group 52. In this way, the CPU 161 assigns the phase information associated with each of two or more reception positions corresponding to the second end in the horizontal direction of the predetermined area A to the second group 52. The CPU 161 may assign the phase information associated with each of any two or more reception positions other than the positions corresponding to the end to the second group 52. The CPU 161 may assign the phase information associated with each of three or more reception positions to the second group 52.

Next, an example of estimating an arrival direction of the response wave to each group by the CPU 161 is described.

The CPU 161 estimates the arrival direction of the response wave to each group based on the phase difference of the response wave among the plurality of virtual antennas as explained further below.

Figure 5:
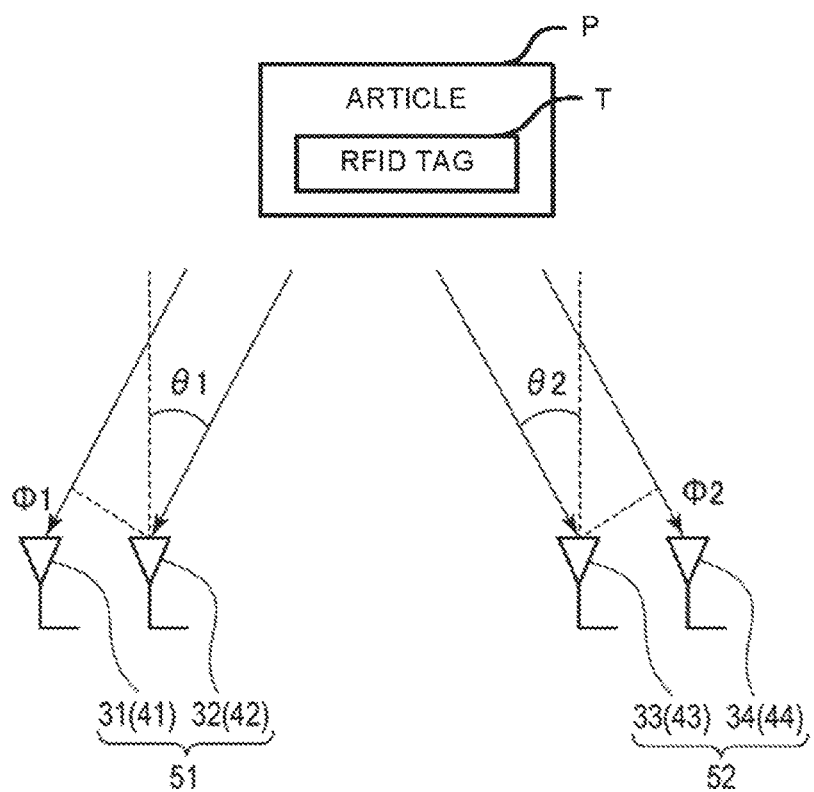
FIG. 5 is a diagram illustrating a phase difference of the response wave for virtual antennas of the wireless tag reading apparatus according to an embodiment.

FIG. 5 is a diagram illustrating the phase difference of the response wave in each group shown in FIG. 4.

The first group 51 is described next.

The phase information of the response wave received by the virtual antenna 41 at the position 31 and the phase information of the response wave received by the virtual antenna 42 at the position 32 are assigned to the first group 51. The virtual antenna 41 is located at a position different from the virtual antenna 42. The response wave arrives at the virtual antenna 42 first and then arrives at the virtual antenna 41. Therefore, a difference occurs between the phase of the response wave received by the virtual antenna 41 and the phase of the response wave received by the virtual antenna 42. The CPU 161 uses the phase of the response wave received by the virtual antenna 42 as a reference. The CPU 161 obtains the phase of the response wave received by the virtual antenna 41 as a phase delayed by $\varphi_1$ from the phase of the response wave received by the virtual antenna 42.

$\varphi_1$ is a first phase difference of the response wave in the first group 51. Here, if the phase of the response wave received by the virtual antenna 41 is delayed with respect to the phase of the response wave received by the virtual antenna 42, the first phase difference $\varphi_1$ is a positive value. On the other hand, if the phase of the response wave received by the virtual antenna 41 is ahead of the phase of the response wave received by the virtual antenna 42, the first phase difference $\varphi_1$ is a negative value.

The CPU 161 calculates the first phase difference $\varphi_1$ based on the phase information assigned to the first group 51. The CPU 161 calculates the first phase difference $\varphi_1$ based on the phase information associated with the reception position of the virtual antenna 41 and the phase information associated with the reception position of the virtual antenna 42.

The first phase difference $\varphi_1$ has the following relationship with an arrival angle $\theta_1$ (may be referred to as an incident angle). The arrival angle $\theta_1$ is an example of the arrival direction of the response wave.

$$\varphi_1 = \frac{2\pi}{\lambda} d_1 \sin\theta_1 \qquad \text{Equation (1)}$$

Where, $\lambda$ is a wavelength in the wireless system to be used, and $d_1$ is a distance from the position 31 of the virtual antenna 41 to the position 32 of the virtual antenna 42.

The arrival angle $\theta_1$ is an acute angle formed by the vertical direction and the arrival direction of the response wave in the first group 51. The CPU 161 estimates a first slop of the arrival direction of the response wave with respect to the vertical direction based on the arrival angle $\theta_1$. The first slope is a slope of the arrival direction of the response wave with respect to the vertical direction in the first group 51.

As described above, if the phase of the response wave received by the virtual antenna 41 is delayed with respect to the phase of the response wave received by the virtual antenna 42, the first phase difference φ1 is a positive value. When the first phase difference $\varphi_1$ is a positive value, the arrival angle $\theta_1$ is a positive value as can be calculated from Equation (1). When the arrival angle $\theta_1$ is a positive value, the CPU 161 estimates the first slope as a slope towards the inside of the predetermined area A with respect to the vertical direction.

As described above, if the phase of the response wave received by the virtual antenna 41 is ahead of the phase of the response wave received by the virtual antenna 42, the first phase difference $\varphi_1$ is a negative value. When the first phase difference $\varphi_1$ is a negative value, the arrival angle $\theta_1$ is a negative value as can be calculated from Equation (1). When the arrival angle $\theta_1$ is a negative value, the CPU 161 estimates the first slope as a slope towards the outside of the predetermined area A with respect to the vertical direction.

Thus, the CPU 161 estimates the first arrival direction of the response wave to the first group 51 based on the first phase difference $\varphi_1$. Typically, the CPU 161 estimates the first arrival direction by calculating the arrival angle $\theta_1$ using Equation (1).

The second group 52 is described.

The phase information of the response wave received by the virtual antenna 43 at the position 33 and the phase information of the response wave received by the virtual antenna 44 at the position 34 are assigned to the second group 52. The virtual antenna 43 is located at a position different from the virtual antenna 44. The response wave arrives at the virtual antenna 43 first and then arrives at the virtual antenna 44. Therefore, a difference occurs between the phase of the response wave received by the virtual antenna 43 and the phase of the response wave received by the virtual antenna 44. The CPU 161 uses the phase of the response wave received by the virtual antenna 44 as a reference. The CPU 161 obtains the phase of the response wave received by the virtual antenna 43 as a phase ahead of the phase of the response wave received by the virtual antenna 44 by $\varphi_2$.

$\varphi_2$ is a second phase difference of the response wave in the second group 52. Here, if the phase of the response wave received by the virtual antenna 43 is delayed with respect to the phase of the response wave received by the virtual antenna 44, the second phase difference $\varphi_2$ is a positive value. On the other hand, if the phase of the response wave received by the virtual antenna 43 is ahead of the phase of the response wave received by the virtual antenna 44, the second phase difference $\varphi_2$ is a negative value.

The CPU 161 calculates the second phase difference $\varphi_2$ based on the phase information assigned to the second group 52. The CPU 161 calculates the second phase difference $\varphi_2$ based on the phase information associated with the reception position of the virtual antenna 43 and the phase information associated with the reception position of the virtual antenna 44.

The second phase difference $\varphi_2$ has the following relationship with an arrival angle $\theta_2$ (may be referred to as an incident angle). The arrival angle $\theta_2$ is an example of the arrival direction of the response wave.

$$\varphi_2 = \frac{2\pi}{\lambda} d_2 \sin\theta_2 \qquad \text{Equation (2)}$$

Where, $\lambda$ is a wavelength in the wireless system, and $d_2$ is a distance from the position 33 of the virtual antenna 43 to the position 34 of the virtual antenna 44.

The arrival angle $\theta_2$ is an acute angle formed by the vertical direction and the arrival direction of the response wave in the second group 52. The CPU 161 estimates a second slop of the arrival direction of the response wave with respect to the vertical direction based on the arrival angle $\theta_2$. The second slope is a slope of the arrival direction of the response wave with respect to the vertical direction in the second group 52.

As described above, if the phase of the response wave received by the virtual antenna 43 is delayed with respect to the phase of the response wave received by the virtual antenna 44, the second phase difference $\varphi_2$ is a positive value. When the second phase difference $\varphi_2$ is a positive value, the arrival angle $\theta_2$ is a positive value as can be calculated from Equation (2). When the arrival angle $\theta_2$ is a positive value, the CPU 161 estimates the second slope as a slope towards the outside of the predetermined area A with respect to the vertical direction.

As described above, if the phase of the response wave received by the virtual antenna 43 is ahead of the phase of the response wave received by the virtual antenna 44, the second phase difference $\varphi_2$ is a negative value. When the second phase difference $\varphi_2$ is a negative value, the arrival angle $\theta_2$ is a negative value as can be calculated from Equation (2). When the arrival angle $\theta_2$ is a negative value, the CPU 161 estimates the second slope as a slope towards the inside of the predetermined area A with respect to the vertical direction.

Thus, the CPU 161 estimates the second arrival direction of the response wave to the second group 52 based on the second phase difference $\varphi_2$. Typically, the CPU 161 estimates the second arrival direction by calculating the arrival angle $\theta_2$ using Equation (2).

Next, an example of determining whether or not the RFID tag T is in the predetermined area A by the CPU 161 is described.

The CPU 161 determines whether or not the RFID tag T is in the predetermined area A based on the first arrival direction and the second arrival direction, as explained further below.

First, a first position estimation processing by the CPU 161 is described.

Figure 6:
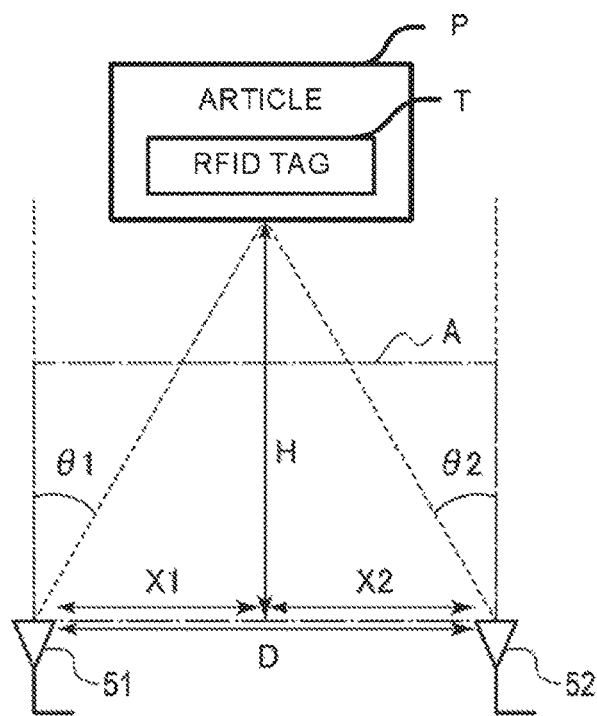
FIG. 6 is a diagram illustrating an example of position estimation for an RFID tag by the wireless tag reading apparatus according to an embodiment.

FIG. 6 is a diagram illustrating position estimation for the RFID tag T according to the first position estimation processing.

The CPU 161 extracts estimation results in any two groups from estimation results relating to the arrival direction of the response wave in a plurality of groups. Here, it is assumed that the CPU 161 extracts the estimation result relating to the first arrival direction in the first group 51 corresponding to the above-described first end. The estimation result relating to the first arrival direction contains information relating to the arrival angle $\theta_1$. Similarly, it is assumed that the CPU 161 extracts the estimation result relating to the second arrival direction in the second group 52 corresponding to the above-described second end. The estimation result relating to the second arrival direction contains information relating to the arrival angle $\theta_2$. FIG. 6 shows an example in which the arrival angle $\theta_1$ is a positive value and the arrival angle $\theta_2$ is a negative value.

The value H is a distance from the upper surface 21 of the table 2 to the RFID tag T in the vertical direction. D is a distance from the first group 51 to the second group 52 in the horizontal direction. D may be the shortest distance between a virtual antenna involved in the first group 51 and a virtual antenna involved in the second group 52. D may be a distance from the virtual antenna 42 involved in the first group 51 to the virtual antenna 44 involved in the second group 52.

The value of H can be expressed as follows using D, the arrival angle $\theta_1$ and the arrival angle $\theta_2$.

$$H = \frac{D}{\tan\theta_1 - \tan\theta_2} \qquad \text{Equation (3)}$$

Where, $X_1$ is a distance from a position where the first group 51 is projected on the upper surface 21 in the vertical direction to a position where the RFID tag T is projected on the upper surface. For example, $X_1$ may be a distance from a position where the virtual antenna 42 involved in the first group 51 is projected on the upper surface 21 to a position where the RFID tag T is projected on the upper surface 21.

$X_1$ can be expressed as follows using H and the arrival angle $\theta_1$.

$$X_1 = H \tan\theta_1 \qquad \text{Equation (4)}$$

In this context, $X_2$ is a distance from a position where the second group 52 is projected on the upper surface 21 in to a position where the RFID tag T is projected on the upper surface 21. For example, $X_2$ may be a distance from a position where the virtual antenna 44 involved in the second group 52 is projected on the upper surface 21 to a position where the RFID tag T is projected on the upper surface 21.

The value of $X_2$ can be expressed as follows using H and the arrival angle $\theta_2$.

$$X_2 = -H \tan\theta_2 \qquad \text{Equation (5)}$$

The CPU 161 estimates the position of the RFID tag T in the vertical direction based on the first arrival direction and the second arrival direction. Here, the CPU 161 estimates the position of the RFID tag T in the vertical direction by calculating H using Equation (3).

The CPU 161 determines whether or not the RFID tag T is in the predetermined area A based on the position of the RFID tag T in the vertical direction. Here, the CPU 161 determines whether or not H is less than a threshold value in the vertical direction. The threshold value in the vertical direction is a distance from the upper surface 21 to a boundary of the predetermined area A in the vertical direction. If H is less than the threshold value in the vertical direction, the CPU 161 determines that the RFID tag T is in the predetermined area A along the vertical direction. If H is equal to or larger than the threshold value in the vertical direction, the CPU 161 determines that the RFID tag T is outside of the predetermined area A in the vertical direction.

Thus, the CPU 161 can estimate the position of the RFID tag T in the vertical direction according to the first position estimation processing. The CPU 161 can determine whether or not the RFID tag T is in the predetermined area A along the vertical direction.

The CPU 161 estimates the position of the RFID tag T in the horizontal direction based on the first arrival direction and the second arrival direction. Here, the CPU 161 estimates the position of the RFID tag T in the horizontal direction by calculating $X_1$ and $X_2$ using Equation (4) and Equation (5).

The CPU 161 determines whether or not the RFID tag T is in the predetermined area A based on the position of the RFID tag T in the horizontal direction. Here, for example, the CPU 161 determines whether or not the sum of $X_1$ and $X_2$ is less than the threshold value in the horizontal direction. The threshold value in the horizontal direction is a distance between the opposite boundaries of the predetermined area A in the horizontal direction. If the sum of $X_1$ and $X_2$ is less than the threshold value in the horizontal direction, the CPU 161 determines that the RFID tag T is in the predetermined area A in the horizontal direction. If the sum of $X_1$ and $X_2$ is equal to or larger than the threshold value in the horizontal direction, the CPU 161 determines that the RFID tag T is outside of the predetermined area A in the horizontal direction.

Thus, the CPU 161 can estimate the position of the RFID tag T in the horizontal direction according to the first position estimation processing. The CPU 161 can determine whether or not the RFID tag T is in the predetermined area A in an estimated direction.

Next, a second position estimation processing by the CPU 161 is described.

Figure 7:
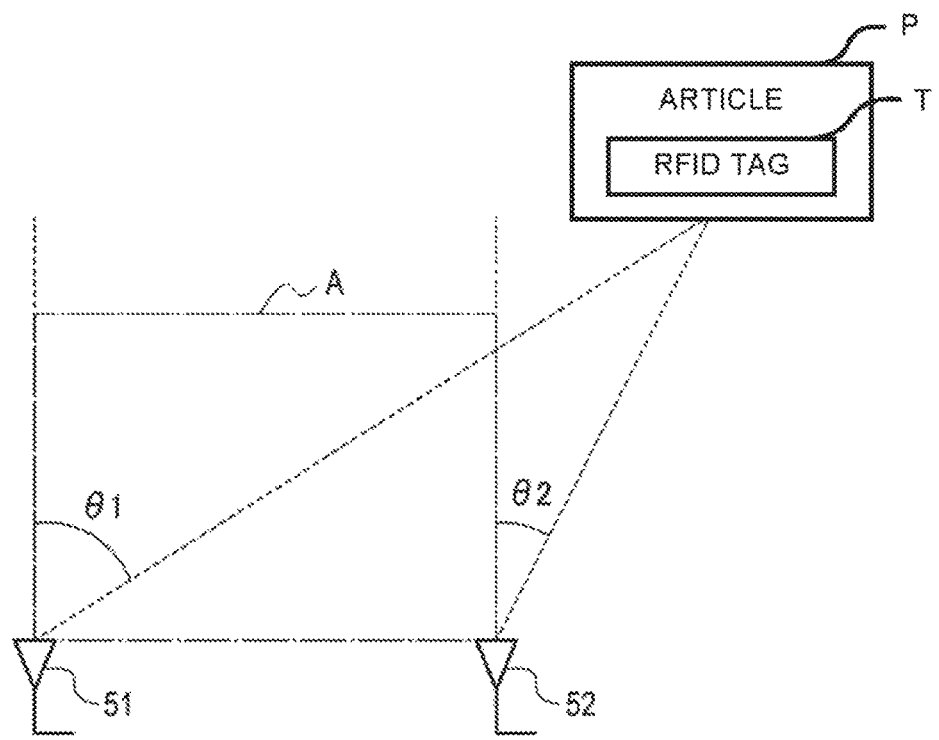
FIG. 7 is a diagram illustrating another example of position estimation for the RFID tag by the wireless tag reading apparatus according to an embodiment.

FIG. 7 is a diagram illustrating an example of position estimation for the RFID tag T according to the second position estimation processing.

The CPU 161 extracts the estimation result relating to the first arrival direction in the first group 51 corresponding to the first end described above from the estimation results relating to the arrival direction of the response wave in the plurality of groups. The estimation result relating to the first arrival direction includes information relating to the arrival angle $\theta_1$ and the first slope. Similarly, the CPU 161 extracts the estimation result relating to the second arrival direction in the second group 52 corresponding to the second end described above. The estimation result relating to the second arrival direction includes information relating to the arrival angle $\theta_2$ and the second slope.

The CPU 161 determines whether or not the RFID tag T is in the predetermined area A based on the first slope and the second slope. For example, the CPU 161 determines whether or not the RFID tag T is in the predetermined area A based on the combination of signs of the arrival angle $\theta_1$ and the arrival angle $\theta_2$. The combination of the signs of the arrival angle $\theta_1$ and the arrival angle $\theta_2$ corresponds to a combination of whether the first slope is the slope towards the inside of the predetermined area A and whether the second slope is the slope towards the inside of the predetermined area A.

If the arrival angle $\theta_1$ and the arrival angle $\theta_2$ have different signs, the CPU 161 determines that the RFID tag T is in the predetermined area A along the horizontal direction. If the arrival angle $\theta_1$ and the arrival angle $\theta_2$ have different signs, the first slope is the slope towards the inside of the predetermined area A, and the second slope is the slope towards the inside of the predetermined area A.

If the arrival angle $\theta_1$ and the arrival angle $\theta_2$ have the same sign, the CPU 161 determines that the RFID tag T is outside of the predetermined area A in the horizontal direction. If the arrival angle $\theta_1$ and the arrival angle $\theta_2$ have the same sign, the first slope is the slope towards the outside of the predetermined area A and the second slope is the slope towards the inside of the predetermined area A. Or, if the arrival angle $\theta_1$ and the arrival angle $\theta_2$ have the same sign, the first slope is the slope towards the inside of the predetermined area A, and the second slope is the slope towards the outside of the predetermined area A.

Thus, the CPU 161 can estimate the position of the RFID tag T in the horizontal direction according to the second position estimation processing. The CPU 161 can determine whether or not the RFID tag T is in the predetermined area A along the horizontal direction.

A processing of reading the RFID tag T by the CPU 161 is described.

Figure 8:
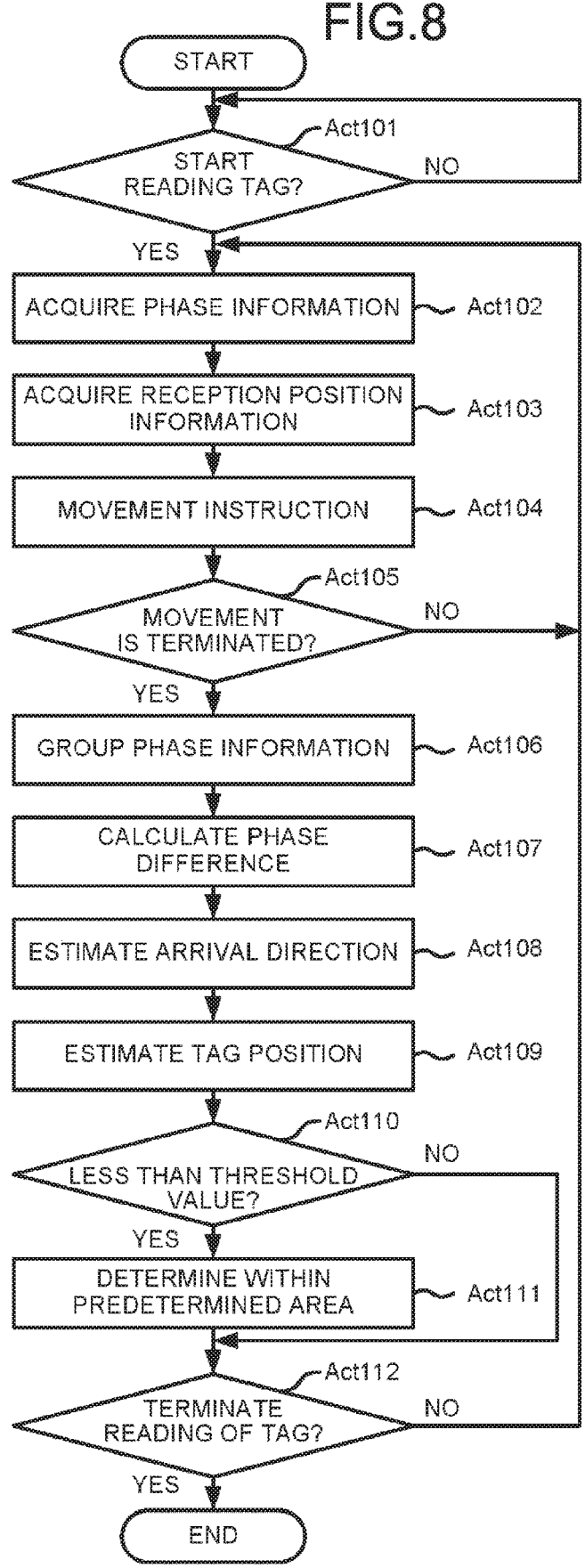
FIG. 8 is a flowchart depicting an example of processing of reading the RFID tag by the wireless tag reading apparatus according to an embodiment.

FIG. 8 is a flowchart depicting an example of the processing of reading the RFID tag T using the first position estimation processing by the CPU 161.

The CPU 161 determines whether to start reading the RFID tag T (Act 101). If the CPU 161 determines not to start reading the RFID tag T (No in Act 101), the CPU 161 stands by until an instruction to start reading the RFID tag T is input.

If the CPU 161 determines to start reading the RFID tag T (Yes in Act 101), the CPU 161 controls each section to start reading the RFID tag T.

The CPU 161 acquires the phase information from the wireless tag communication unit 12 (Act 102). In Act 102, the CPU 161 stores the phase information and the information recorded in the RFID tag T in the storage device 164.

The CPU 161 acquires the reception position information from the drive unit 15 (Act 103). In Act 103, the CPU 161 stores the reception position information in the storage device 164 in association with the phase information and the information recorded in the RFID tag T.

The CPU 161 outputs a movement instruction to the drive unit 15 to move the position of the antenna 11 (Act 104). The CPU 161 determines whether or not the movement of the position of the antenna 11 is terminated (Act 105). If it is determined that the movement of the position of the antenna 11 is not terminated (No in Act 105), the CPU 161 executes the processing in Act 102 again.

If it is determined that the movement of the position of the antenna 11 is terminated (Yes in Act 105), the phase information is assigned to each of the plurality of groups (Act 106).

The CPU 161 calculates the phase difference in each group based on the phase information assigned to each group (Act 107). In Act 107, for example, the CPU 161 calculates the first phase difference $\varphi_1$ in the first group 51. The CPU 161 calculates the second phase difference $\varphi_2$ in the second group 52.

The CPU 161 estimates the arrival direction of the response wave to each group based on the phase difference in each group (Act 108). In Act 108, for example, the CPU 161 estimates the first arrival direction of the response wave to the first group 51 based on the first phase difference $\varphi_1$. The CPU 161 estimates the second arrival direction of the response wave to the second group 52 based on the second phase difference $\varphi_2$.

The CPU 161 estimates the position of the RFID tag T according to the above-mentioned first position estimation processing based on the arrival direction of the response wave to the two or more groups (Act 109). In Act 109, for example, the CPU 161 estimates the position of the RFID tag T in the vertical direction according to the above-described first position estimation processing. In place of or in addition to that, the CPU 161 estimates the position of the RFID tag T in the horizontal direction according to the above-described first position estimation processing.

The CPU 161 determines whether or not a parameter relating to the position of the RFID tag T, such as H or the sum of $X_1$ and $X_2$, is less than a threshold value (Act 110). In Act 110, for example, the CPU 161 compares H associated with the position of the RFID tag T in the vertical direction with the threshold value in the vertical direction. In place of or in addition to that, the CPU 161 compares the sum of $X_1$ and $X_2$ associated with the position of the RFID tag T in the horizontal direction with the threshold value in the horizontal direction.

If the parameter relating to the position of the RFID tag T is less than the threshold value (Yes in Act 110), the CPU 161 determines that the RFID tag T is in the predetermined area A (Act 111). In Act 111, for example, if H is less than the threshold value in the vertical direction, the CPU 161 determines that the RFID tag T is in the predetermined area A along the vertical direction. If the sum of $X_1$ and $X_2$ is less than the threshold value in the horizontal direction, the CPU 161 determines that the RFID tag T is in the predetermined area A along the horizontal direction. If H is less than the threshold value in the vertical direction and the sum of $X_1$ and $X_2$ is less than the threshold value in the horizontal direction, the CPU 161 determines that the RFID tag T is in the predetermined area A.

The CPU 161 determines whether to terminate the reading of the RFID tag T (Act 112). If the CPU 161 determines to terminate the reading of the RFID tag T (Yes in Act 112), the CPU 161 terminates the reading processing. If the CPU 161 determines not to terminate the reading of the RFID tag T (No in Act 112), the CPU 161 executes the processing in Act 102 again.

If the parameter relating to the position of the RFID tag T is not less than the threshold value (No in Act 110), the CPU 161 executes the processing in Act 112. For example, if H is equal to or larger than the threshold value in the vertical direction, the CPU 161 determines that the RFID tag T is outside of the predetermined area A in the vertical direction. If the sum of $X_1$ and $X_2$ is equal to or larger than the threshold value in the horizontal direction, the CPU 161 determines that the RFID tag T is outside of the predetermined area A in the horizontal direction.

Figure 9:
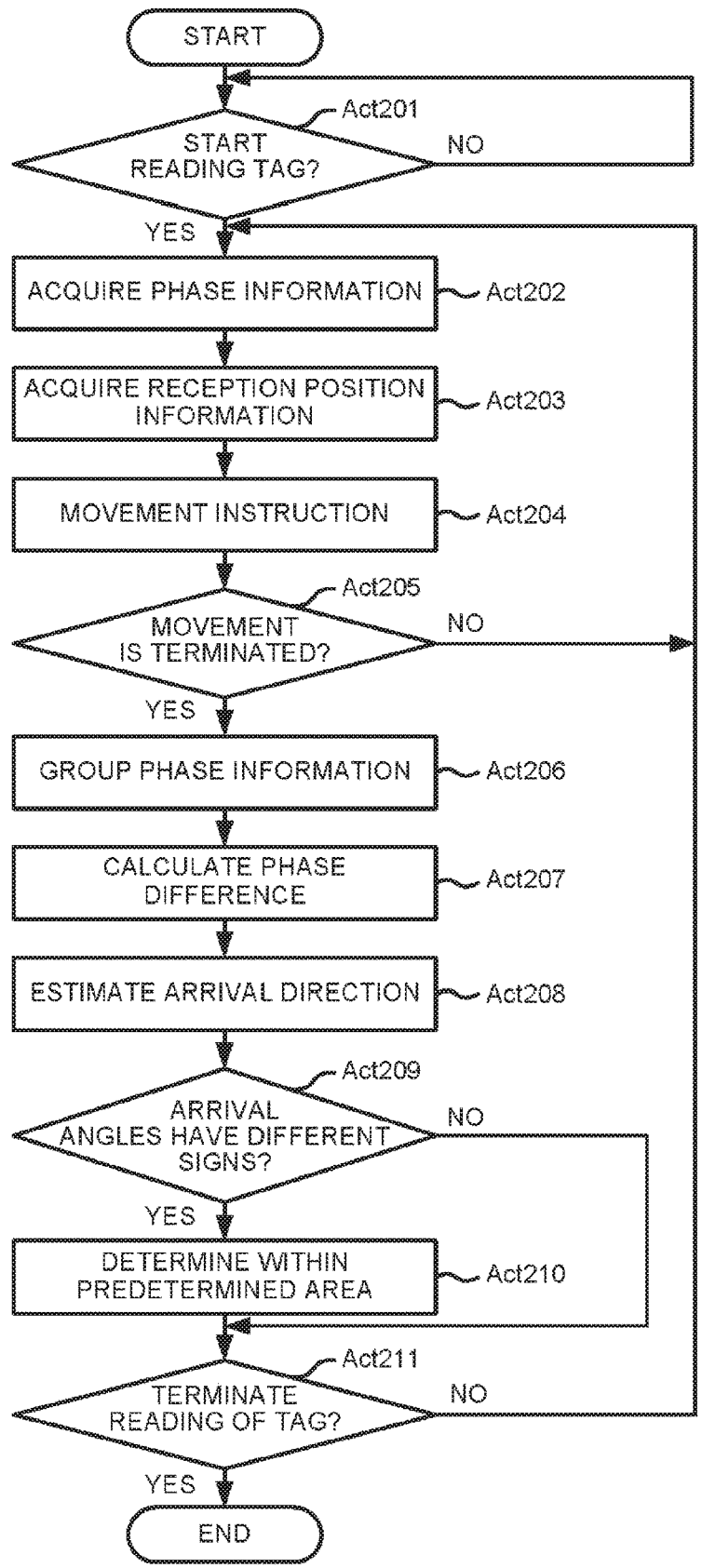
FIG. 9 is a flowchart depicting another example of the processing of reading the RFID tag by the wireless tag reading apparatus according to an embodiment.

FIG. 9 is a flowchart depicting a processing of reading the RFID tag T using the second position estimation processing by the CPU 161.

Since Act 201 to Act 208, Act 210, and Act 211 are the same as Act 101 to Act 108, Act 111, and Act 112 described above, the description thereof is omitted.

The processing in Act 209 is described.

The CPU 161 determines whether or not the arrival angles to respective group have different signs (Act 209). In Act 209, for example, the CPU 161 determines whether or not the arrival angle $\theta_1$ and the arrival angle $\theta_2$ have different signs.

If the arrival angle $\theta_1$ and the arrival angle $\theta_2$ have different signs (Yes in Act 209), the CPU 161 determines that the RFID tag T is in the predetermined area A along the horizontal direction (Act 210). If the arrival angle $\theta_1$ and the arrival angle $\theta_2$ have the same sign (No in Act 209), the CPU 161 executes the processing in Act 211. If the arrival angle $\theta_1$ and the arrival angle $\theta_2$ have the same sign, the CPU 161 determines that the RFID tag T is outside of the predetermined area A in the horizontal direction.

According to an embodiment, the wireless tag reading apparatus 1 determines whether or not the RFID tag T is in the predetermined area A based on the first arrival direction and the second arrival direction of the response wave.

The wireless tag reading apparatus 1 radiates electromagnetic waves through the antenna 11 to communicate with the RFID tag T. The wireless tag reading apparatus 1 sets the power to be supplied from the wireless tag communication unit 12 to the antenna 11 as strongly as possible to minimize the number of RFID tags T to be missed. This is because it is unclear where the RFID tag T that the wireless tag reading apparatus 1 intends to read is positioned. Therefore, even when the wireless tag reading apparatus 1 can communicate with a tag that is not required to be registered, the wireless tag reading apparatus 1 reads the information of the tag that is not required to be registered.

Whether the RFID tag T is in the predetermined area A can be determined by the wireless tag reading apparatus 1 based on the first arrival direction and the second arrival direction of the response wave, without using a dedicated container. Therefore, the wireless tag reading apparatus 1 can determine whether or not the read information is the information of a desired tag required to be registered depending on whether the RFID tag T is in the predetermined area A.

According to the embodiment, the wireless tag reading apparatus 1 can estimate the position of the RFID tag T in the vertical direction based on the first arrival direction and the second arrival direction. The wireless tag reading apparatus 1 can determine whether or not the RFID tag T is in the predetermined area A based on the position of the RFID tag T in the vertical direction.

In this way, the wireless tag reading apparatus 1 can determine whether or not the RFID tag T is in the predetermined area A in the vertical direction without using a dedicated container.

According to the embodiment, the wireless tag reading apparatus 1 can estimate the position of the RFID tag T in the horizontal direction based on the first arrival direction and the second arrival direction. The wireless tag reading apparatus 1 can determine whether or not the RFID tag T is in the predetermined area A based on the position of the RFID tag T in the horizontal direction.

In this way, the wireless tag reading apparatus 1 can determine whether or not the RFID tag T is in the predetermined area A along the horizontal direction without using a dedicated container.

According to the embodiment, the wireless tag reading apparatus 1 can determine whether or not the RFID tag T is in the predetermined area A based on the first slope and the second slope.

In this way, the wireless tag reading apparatus 1 can determine whether or not the RFID tag T is in the predetermined area A in the horizontal direction without using a dedicated container.

According to the embodiment, the wireless tag reading apparatus 1 can determine whether or not the RFID tag T is in the predetermined area A based on the combination of the first slope and the second slope.

In this way, the wireless tag reading apparatus 1 can more accurately determine whether or not the RFID tag T is in the predetermined area A along the horizontal direction without using a dedicated container or electromagnetic shielding around the predetermined area A.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A wireless tag reading apparatus, comprising:
   an antenna configured to receive a response wave signal from a wireless tag;
   an actuator configured to move the antenna in a direction along a predetermined effective detection region;
   a phase detector configured to detect a phase of the response wave signal received by the antenna; and
   a processor configured to:
      calculate a first phase difference, based on the phase of the response wave signal received by the antenna at a first plurality of antenna positions that are proximate to each other, and a second phase difference, based on the phase of the response wave signal received by the antenna at a second plurality of antenna positions that are proximate to each other;
      calculate a first incident angle of the response wave signal for the antenna at the first plurality of antenna positions based on the first phase difference, and a second incident angle of the response wave signal for the antenna at the second plurality of antenna positions based on the second phase difference;

determine whether the wireless tag is in the predetermined effective detection region based on the first incident angle and the second incident angle; and
register tag information included in the response wave signal upon determining that the wireless tag is in the predetermined effective detection region.

2. The wireless tag reading apparatus according to claim 1, wherein the processor is configured to discard the tag information upon determining that the wireless tag is not in the predetermined effective detection region.

3. The wireless tag reading apparatus according to claim 1, wherein
the predetermined effective detection region spans a first predetermined range in a horizontal direction and a second predetermined range in a vertical direction, and
the processor is configured to:
calculate a horizontal position and a vertical position of the wireless tag based on the first incident angle and the second incident angle; and
compare the calculated horizontal and vertical positions of the wireless tag with the first and second predetermined ranges, respectively, to determine whether or not the wireless tag is in the predetermined effective detection region.

4. The wireless tag reading apparatus according to claim 3, wherein the actuator is configured to move the antenna in the horizontal direction.

5. The wireless tag reading apparatus according to claim 1, wherein
the predetermined effective detection region spans a predetermined range in the direction, and
the processor is configured to determine whether the wireless tag is in the predetermined range in the direction based on signs of the first and second incident angles.

6. The wireless tag reading apparatus according to claim 5, wherein the processor is configured to determine that the wireless tag is in the predetermined range in the direction when the signs of the first and second incident angles are the same and that the wireless tag is outside of the predetermined range in the direction when the signs of the first and second incident angles are different from each other.

7. The wireless tag reading apparatus according to claim 1, wherein
the first plurality of antenna positions are proximate to a first end of the predetermined effective detection region in the direction, and
the second plurality of antenna positions are proximate to a second end of the predetermined effective detection region opposite to the first end.

8. The wireless tag reading apparatus according to claim 1, further comprising:
a table having a placement surface on which an article with the wireless tag is to be placed, wherein
the antenna is below the placement surface of the table.

9. The wireless tag reading apparatus according to claim 1, wherein the processor is configured to control the actuator to move the antenna.

10. The wireless tag reading apparatus according to claim 1, wherein the predetermined effective detection region is a non-shielded region without electromagnetic shielding therearound.

11. A method for reading a wireless tag, comprising:
moving an antenna in a direction along a predetermined effective detection region, the antenna configured to receive a response wave signal from a wireless tag;
detect a phase of the response wave signal received by the antenna as the antenna is moved;
calculating a first phase difference based on the phase of the response wave signal received by the antenna at a first plurality of antenna positions that are proximate to each other, and a second phase difference based on the phase of the response wave signal received by the antenna at a second plurality of antenna positions that are proximate to each other;
calculating a first incident angle of the response wave signal into the antenna at the first plurality of antenna positions based on the first phase difference, and a second incident angle of the response wave signal into the antenna at the second plurality of antenna positions based on the second phase difference;
determining whether the wireless tag is in the predetermined effective detection region based on the first incident angle and the second incident angle; and
registering tag information included in the response wave signal upon determining that the wireless tag is in the predetermined effective detection region.

12. The method according to claim 11, further comprising:
discarding the tag information upon determining that the wireless tag is not in the predetermined effective detection region.

13. The method according to claim 11, wherein
the predetermined effective detection region spans a first predetermined range in a horizontal direction and a second predetermined range in a vertical direction, and
the method further comprising:
calculating a horizontal position and a vertical position of the wireless tag based on the first incident angle and the second incident angle; and
comparing the calculated horizontal position to the first predetermined range and the calculated vertical position to the second predetermined ranges, and determining whether the wireless tag is in the predetermined effective detection region according to the comparisons.

14. The method according to claim 13, wherein the antenna is moved in the horizontal direction.

15. The method according to claim 11, wherein
the predetermined effective detection region spans a predetermined range, and
the determination of whether the wireless tag is in the predetermined effective detection region comprises determining whether the wireless tag is in the predetermined range based on signs of the first and second incident angles.

16. The method according to claim 11, wherein the wireless tag is an RFID tag.

17. The method according to claim 11, wherein
the first plurality of antenna positions are proximate to a first end of the predetermined effective detection region in the direction, and
the second plurality of antenna positions are proximate to a second end of the predetermined effective detection region opposite to the first end.

18. The method according to claim 11, wherein the antenna is below a surface of a table on which an item to which the wireless tag is attached can be placed.

19. The method according to claim 11, further comprising:
registering an item in a sales transaction based on registered tag information.

20. The method according to claim 11, wherein the predetermined effective detection region is a non-shielded region without electromagnetic shielding therearound.

* * * * *